March 13, 1928. 1,662,210
J. J. SALM
TORCH
Filed Dec. 31, 1926
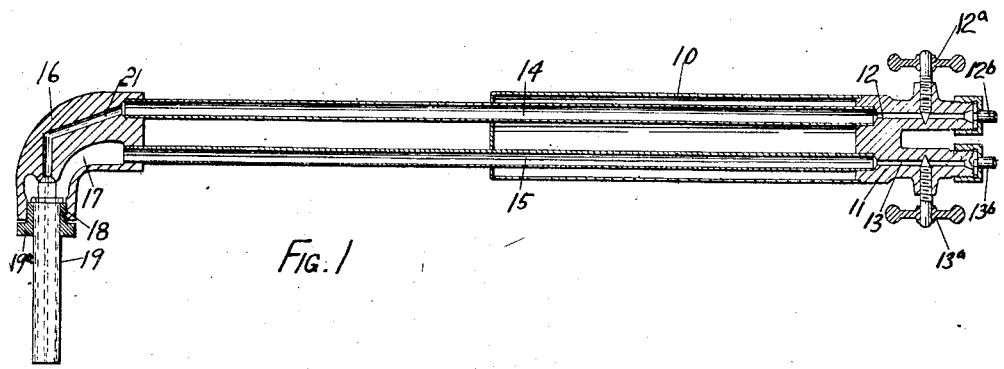
Fig. 1
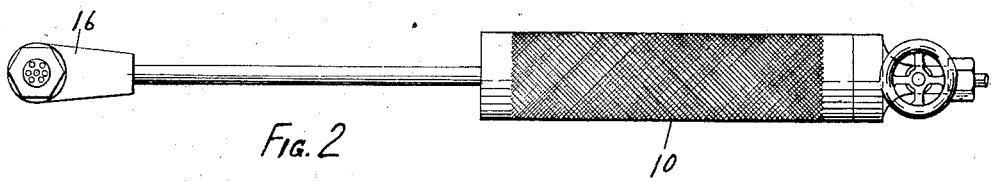
Fig. 2
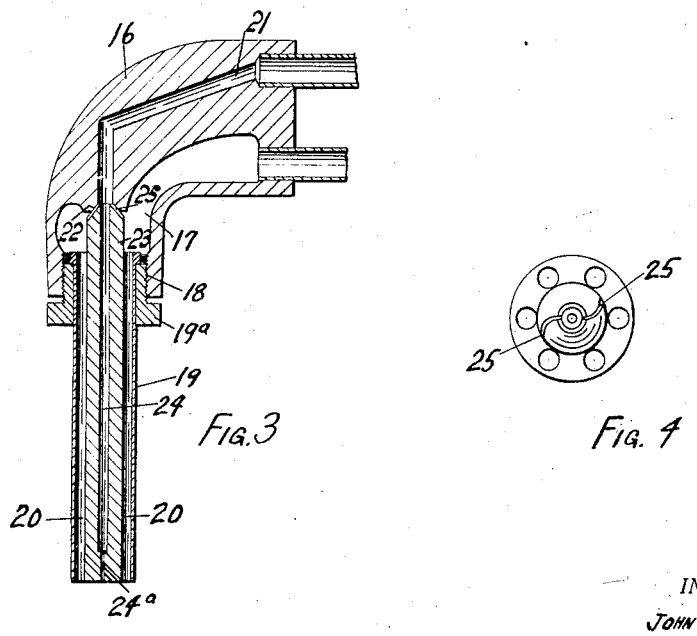
Fig. 3
Fig. 4
INVENTOR.
JOHN J. SALM
BY Ely & Barrow
ATTORNEYS.

Patented Mar. 13, 1928.

1,662,210

UNITED STATES PATENT OFFICE.

JOHN J. SALM, OF AKRON, OHIO.

TORCH.

Application filed December 31, 1926. Serial No. 158,228.

This invention relates to torches capable of using gaseous fuel such as natural gas, by-product gases, etc., to provide a carbonizing flame useful in removing scale, rust or corrosion from metal surfaces, such as rubber vulcanizing molds, etc., and also for use in brazing, burning and other metal working operations.

The general purpose of the invention is to provide an improved torch capable of providing an effective heating flame.

Particularly the invention has for its object the provision of a tip for torches having means therein for thoroughly mixing the gaseous fuel with oxygen to obtain proper combustion at the outlet and to deliver free oxygen into the flame to produce a heat sufficient to carbonize scaled or corroded metal surfaces to convert the scale or corrosion into a loose powder easily brushed off the surfaces of the metal or for brazing and other metal working operations.

The foregoing and other objects are obtained by the torch shown in the accompanying drawings and described below. It is to be understood that the invention is not limited to the specific form thereof shown and described.

Of the accompanying drawings,

Figure 1 is a longitudinal section through a torch embodying the invention;

Figure 2 is a bottom plan thereof;

Figure 3 is a detail section of the nozzle; and

Figure 4 is a top plan of the tip.

Referring to the drawings, the numeral 10 designates a suitable handle supporting at one end a valve housing 11 formed with ducts 12 and 13 respectively for oxygen and gaseous fuel, valves $12^a$ and $13^a$ being arranged to control the flow of oxygen and gas therethrough and connections respectively for oxygen and gas supply lines being shown at $12^b$ and $13^b$. Conduits 14 and 15 connected respectively to ducts 12 and 13 are extended through handle 10 and have a nozzle 16 secured on their outer ends.

Nozzle 16 is formed with a mixing chamber 17 into which gas is delivered by conduit 15 and a threaded aperture in the nozzle 16 at 18 is arranged to receive a tip 19 formed with ducts 20, 20 for delivering mixed gas and oxygen from chamber 17. Provision of a supply of free oxygen to the flame is effected by forming a duct 21 in nozzle 16 terminating in a cone-shaped seat portion 22; a reduced extended portion 23 formed on tip 19 has a conical end for fitting the seat and a central duct 24 for delivering oxygen from duct 21 into the flame. The tip 19 may be secured in the nozzle against seat 22 by a nut $19^a$ threaded into aperture 18. To supply oxygen to the chamber 17, to provide for effective mixing of the oxygen and gas and to evenly distribute the supply of mixed gas to the several circumferentially arranged ducts 20, spiral slots 25, 25 are formed in the conical end of the tip portion 23 providing ducts for delivering oxygen with a whirling motion to chamber 17. The central duct 24 of the tip is preferably restricted as at $24^a$ to create a back pressure on the oxygen to force it through slots 25 into chamber 17.

In use, a supply of oxygen and a supply of fuel gas, each preferably at the same pressure, for example twenty pounds per square inch, are connected to the torch. The gas and a proportion of the oxygen are thoroughly mixed in chamber 17 and evenly delivered from the torch by ducts 20. Free oxygen is supplied to the issuing gases from the duct 24. The issuing gases are ignited and burn with an even carbonizing heating or burning flame which can be employed for cleaning metal surfaces of scale, deposits or corrosion by converting such deposits or formations into a light powdery, oxidized material which can easily be brushed off the metal and also for brazing, cutting and other metal working operations.

Modifications of the invention may be resorted to without departing from the spirit thereof or the scope of the appended claims.

What is claimed is:

1. A torch comprising a nozzle, means for supplying a gaseous fuel thereto, and means for supplying oxygen thereto, said nozzle having a mixing chamber therein and provided with a seat portion on the inlet to said chamber for the oxygen, said nozzle having a threaded aperture therein in alignment with said seat, a tip extended through said aperture and having a reduced portion extending through the mixing chamber and seated on said seat and means threaded into said aperture to urge the tip against the seat, said tip having a circumferential series of longitudinal ducts through its body portion adapted to deliver a combustible mixture of gases from the mixing chamber to provide a flame, said tip also having a central duct through the body portion and reduced portion adapted to deliver free oxygen to the flame, the seat engaging end of the tip being formed with one or more spiral slots providing ducts for admitting oxygen to the mixing chamber with a whirling motion to thoroughly mix the gases in the chamber and evenly supply the mixed gases to all of the circumferential series of ducts, said central duct being restricted to create a back pressure on the oxygen for forcing a portion thereof into the mixing chamber.

2. A torch comprising a nozzle, means for supplying a gaseous fuel thereto, and means for supplying oxygen thereto, said nozzle having a mixing chamber therein and provided with a seat portion on the inlet to said chamber for the oxygen, said nozzle having an aperture therein in alignment with said seat, a tip extended through said aperture and having a reduced portion extending through the mixing chamber and seated on said seat, said tip having a circumferential series of longitudinal ducts through its body portion adapted to deliver a combustible mixture of gases from the mixing chamber to provide a flame, said tip also having a central duct through the body portion and reduced portion adapted to deliver free oxygen to the flame, the seat engaging end of the tip being formed with one or more spiral slots providing ducts for admitting oxygen to the mixing chamber with a whirling motion to thoroughly mix the gases in the chamber and evenly supply the mixed gases to all of the circumferential series of ducts, said central duct being restricted to create a back pressure on the oxygen for forcing a portion thereof into the mixing chamber.

3. A torch comprising a nozzle, means for supplying a gaseous fuel thereto, and means for supplying oxygen thereto, said nozzle having a mixing chamber therein and provided with a seat portion on the inlet to said chamber for the oxygen, said nozzle having an aperture therein in alignment with said seat, a tip extended through said aperture and having a reduced portion extending through the mixing chamber and seated on said seat, said tip having a circumferential series of longitudinal ducts through its body portion adapted to deliver a combustible mixture of gases from the mixing chamber to provide a flame, said tip also having a central duct through the body portion and reduced portion adapted to deliver free oxygen to the flame, the seat engaging end of the tip being formed with one or more spiral slots providing ducts for admitting oxygen to the mixing chamber with a whirling motion to thoroughly mix the gases in the chamber and evenly supply the mixed gases to all of the circumferential series of ducts.

4. A torch comprising a nozzle, means for supplying a gaseous fuel thereto, and means for supplying oxygen thereto, said nozzle having a mixing chamber therein and provided with a seat portion on the inlet to said chamber for the oxygen, said nozzle having an aperture therein in alignment with said seat, a tip extended through said aperture and having a portion extending through the mixing chamber and seated on said seat, said tip having a circumferential series of longitudinal ducts through its body portion adapted to deliver a combustible mixture of gases from the mixing chamber to provide a flame, said tip also having a central duct adapted to deliver free oxygen to the flame, the seat engaging end of the tip being formed with one or more spiral slots providing ducts for admitting oxygen to the mixing chamber with a whirling motion to thoroughly mix the gases in the chamber and evenly supply the mixed gases to all of the circumferential series of ducts.

5. A torch having a tip formed with a circumferential series of ducts and a central duct, means for whirling a combustible gaseous mixture in the torch with a motion concentric to the circumferential series of ducts prior to passage through the ducts, and means for supplying oxygen to the central duct.

6. A torch having a tip formed with a circumferential series of ducts, said torch having a mixing chamber in advance of the tip, and means for whirling a combustible gaseous mixture in the mixing chamber prior to passage thereof to the tip, the whirling motion being concentric to the circumferential series of ducts.

7. A torch, said torch including a nozzle having a mixing chamber, ducts for gas and oxygen extending into the mixing chamber, a tip adapted to seat over the oxygen inlet to the chamber, said tip having a circumferential series of ducts therein for directing a combustible mixture of gases from the nozzle, and a duct for directing free oxygen from the nozzle, said seated portion of the tip having spiral slots in the seating surface thereof for directing oxygen into the mixing chamber.

JOHN J. SALM.